United States Patent [19]

Cole et al.

[11] 4,374,154
[45] Feb. 15, 1983

[54] SOFT, FROZEN DESSERT FORMULATION

[75] Inventors: Bruce A. Cole, Tarrytown; Harold I. Levine, Monsey; Michael T. McGuire, Elmhurst; Kathleen J. Nelson, Peekskill; Louise Slade, Monsey, all of N.Y.

[73] Assignee: General Foods Corporation, White Plains, N.Y.

[21] Appl. No.: 320,168

[22] Filed: Nov. 10, 1981

[51] Int. Cl.³ ............................................. A23G 9/00
[52] U.S. Cl. .................................... 426/565; 426/658
[58] Field of Search ................ 426/567, 565, 566, 658

[56] References Cited

U.S. PATENT DOCUMENTS

| | | | |
|---|---|---|---|
| 3,353,122 | 10/1970 | Mussellwhite et al. | 426/565 |
| 3,949,102 | 4/1976 | Hellyer et al. | 426/565 |
| 3,993,793 | 11/1976 | Finney | 426/565 |
| 4,145,454 | 3/1979 | Dea et al. | 426/565 |
| 4,219,581 | 8/1980 | Dea et al. | 426/565 |
| 4,244,977 | 1/1981 | Kahn et al. | 426/330.2 |
| 4,333,953 | 6/1982 | Trzecieski | 426/565 |
| 4,333,954 | 6/1982 | Trzecieski | 426/565 |

FOREIGN PATENT DOCUMENTS 886059  3/1981  Belgium .
1508437  4/1978  United Kingdom ................ 426/565

Primary Examiner—Jeanette M. Hunter
Attorney, Agent, or Firm—Thomas R. Savoie; Daniel J. Donovan

[57] ABSTRACT

A soft frozen dessert product which is readily extruded upon removal from a home freezer and which possesses good textural stability, even after prolonged, freezer storage, can be obtained according to this invention. The products of this invention is characterized as having a defined, and relatively high, ratio of higher saccharides to mono- and disaccharides.

7 Claims, 1 Drawing Figure

SOFT, FROZEN DESSERT FORMULATION

BACKGROUND OF THE INVENTION

This invention provides a new frozen food product, principally for dessert use, that emulates the textural and rheological characteristics of soft serve ice cream while at home freezer temperatures (e.g. 0° F. to 10° F.). The invention embraces a combination of ingredients which define a new frozen dessert product.

Soft serve ice cream, or simply soft serve, is a highly popular dessert with wide appeal. Distinguishing features of conventional soft serve are that it is frozen in a special soft serve freezer, is dispensed by extrusion at carefully chosen subfreezing temperatures and stands up on a cone or dish upon extrusion. Conventional soft serve is usually dispensed at an overrun on the order of 40% to 60%. Although soft serve of this character has been marketed for many years, it is still available only from stores having special freezers that dispense the product for immediate consumption. This is because the produce generally is dispensed at temperatures between 16° F. and 24° F. (−9° C. to −6° C.). At lower temperatures, the product is no longer sufficiently soft. Conventional soft serve accordingly is not suited for sale from grocery store freezers for home storage and use. Home freezers maintain temperatures generally around 0° F. to 10° F. (−18° C. to −12° C.), and store freezers, which as used herein includes grocery store, supermarket, and restaurant freezers, are generally at colder temperatures.

Others have expended considerable effort to develop a soft serve product for home use, but apparently without success. U.S. Pat. No. 4,244,977 to Kahn, U.S. Pat. No. 4,219,581 to Dea et al., U.S. Pat. No. 4,145,454 to Dea et al., and U.S. Pat. No. 3,993,793 to Finney and U.K. Patent Specification No. 1,508,437 disclose frozen food products which supposedly are softer than usual at freezer temperatures. There is considerable other published art on the subject of frozen desserts, particularly ice cream. A recent text is *Ice Cream*, Second Edition by W. S. Arbuckle, Ph.D., published in 1972 by the Avi Publishing Company, Inc., Westport, Conn.

SUMMARY OF THE INVENTION

This invention relates to a storage-stable frozen dessert product which is sufficiently soft from a home freezer (0° F. to 10° F.) to be extrudable. These products can be dispensed by hand from a collapsible package having an extrusion orifice and, preferably, a mechanism to assist in applying pressure to the product. The products of this invention have a high tolerance to freeze-thaw cycling and are able to be stored for prolonged periods between −10° F. and +10° F. without significant growth of ice crystals. The formulations encompassed within the scope of this invention contain a critical combination of mono-, di-, and polysaccharides to achieve a desirable level of freezer softness and storage stability. Various proteins, fats, emulsifiers, stabilizers and flavor and color agents may also be included in these formulations. All percentages and ratios given in this disclosure (except % overrun) are given as weight percents, unless otherwise indicated.

According to this invention the formulations contain a water level of from about 45% to 63% and a total saccharide or carbohydrate level of from about 24% to 34%. The carbohydrates employed in the formulation are selected such that the ratio of higher saccharides to combined mono- and disaccharides and the ratio of disaccharides to monosaccharides fulfill a specific relationship.

When formulating in accordance with this invention, sufficient low molecular weight saccharides are present to depress the freezing point of the formulation several degrees but not sufficient to preclude the formation of ice crystals during product preparation. An absence of ice crystals is undesirable since the product will then not provide the desired and expected coldness impact which the consumer associates with the experience of eating ice cream.

According to a preferred embodiment of this invention, the use of polyhydric alcohols such as glycerol and propylene glycol, as low-molecular weight freezing point depressants, is essentially eliminated. It is also preferred that the product formulations of this invention be essentially free of sugar alcohols, such as sorbitol, which are known to have an undesirable laxative effect. Minor amounts of sugar alcohols, less than 5%, could, however, be included in the product of this invention.

The term "carbohydrate" as used in this disclosure is meant to include soluble compounds composed of carbon, hydrogen and oxygen in which the latter two elements are in the same proportion as in water. Thus the term includes simple sugars (dextrose, fructose), starch hydrolyzates and the like. The term "carbohydrate" does not therefore include sugar alcohols such as sorbitol, mannitol and xylitol or other polyol compounds such as glycerol or propylene glycol.

According to this invention, it is possible to formulate soft from the freezer products which possess the organoleptic properties of taste, texture and mouthfeel of conventional soft serve ice cream. The products of this invention have the ability to be extruded as a continuous ribbon via manual pressure immediately upon removal from a freezer as cold as 0° F. These products will also be tolerant to extended freezer storage of several months and repeated thermal shocks without a significant deterioration of the ice crystal structure. In other words the products of this invention are resistant to the development of large ice crystals during prolonged storage such as would be required for the commercial distribution of the product over large geographical areas and the subsequent storage of the product in the home. Further the normal temperature variations and/or cycling which occur in commercial and household freezer equipment, especially those with frost-free operations, will not destroy the texture of the product.

SOFTNESS METHODOLOGY

Figure 1:
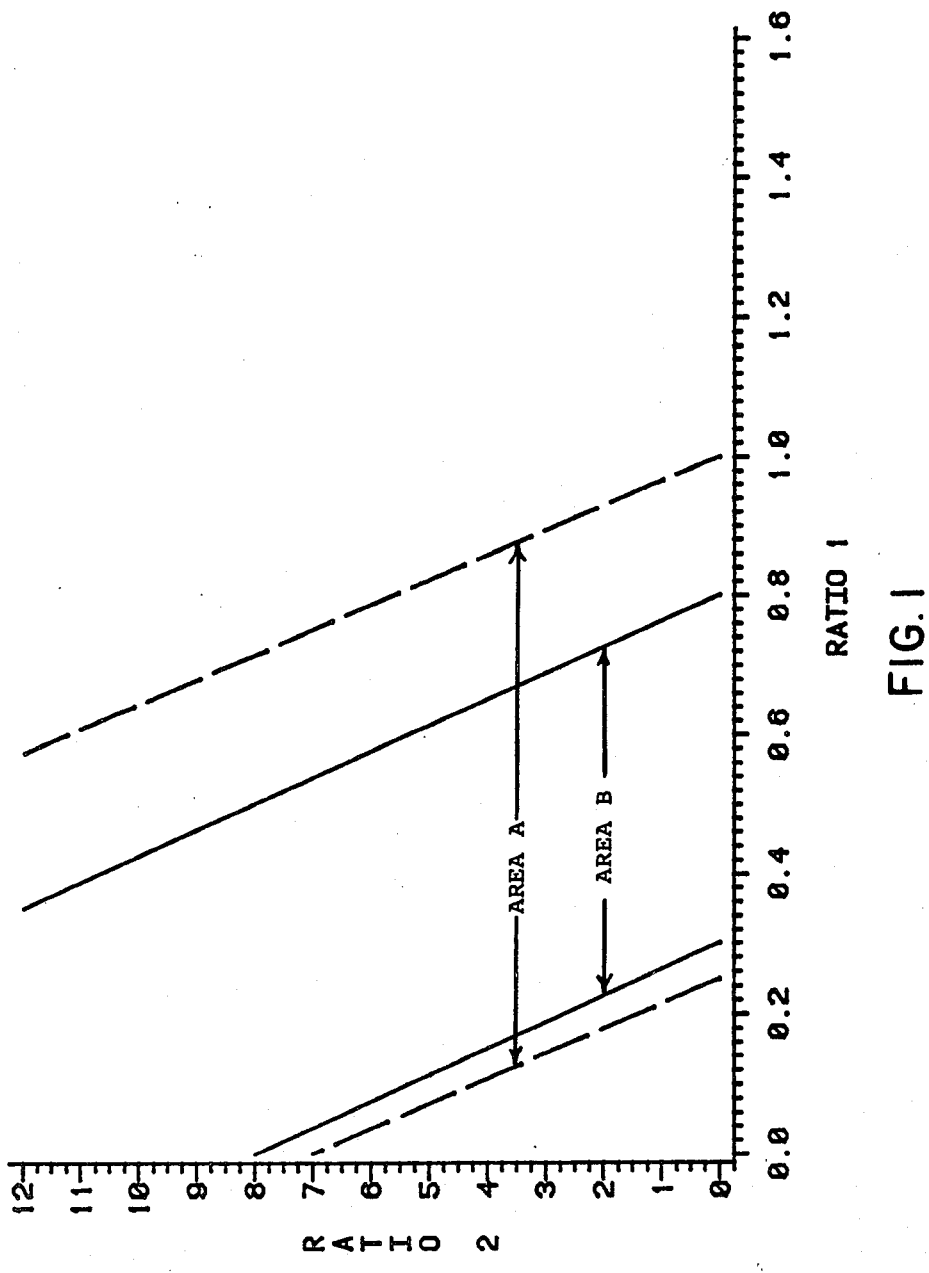
FIG. 1 depicts two regions, identified as Area "A" and Area "B", which characterize the formulations of this invention in terms of saccharide distributions.

The ability of a formulation to be extruded, in the same manner as a soft ice cream, upon removal from a home freezer is judged according to its performance in a standarized Instron Tube Extrusion methodology. Under this test the products were evaluated at 5° F. (−15° C.), with a constant extrusion rate of 2 cc/sec., through a brass nozzle 12.7 mm in diameter and 46.4 mm in length using an Instron Universal Testing Machine (Model 1122). According to this test, plastic tubes 1⅜ inch inside diameter and 8½ inches in length are filled with the soft ice cream formulation as it exits the ice cream freezer. The filled tubes are then placed in an ice cream hardening room and subsequently in an ice cream freezer. The tubes are stored at 5° F. for a 24 hour period before the extrusion test is performed. The nozzle is then affixed to one end of the tube and the tube is positioned vertically (nozzle end down) in the Instron machine. A metal plunger (1½ inch diameter) is then passed into the tube and the contents are forced through the nozzle. After an initial period where the contents are apparently undergoing compression, as evidenced by a downward movement of the plunger with no material exiting the nozzle, the plunger is caused to descend at the rate necessary to extrude the material at the 2 cc/sec. rate. This extrusion takes place at an essentially constant pressure (referred to herein as ITE ΔP) which is recorded graphically by the Instron unit.

It has been found that when the ITE ΔP value, as described above, is greater than 5 psi, the nature of the product is such that it can not be extruded by hand from a collapsible package at 5° F. ITE ΔP values of from 3–5 psi represent products which can be extruded by hand at 5° F., but only with extreme difficulty; values below 3 psi represent products sufficiently soft that hand extrusion at 5° F. is reasonable; however a value of below 1.5 psi will be preferred in order to have easy to extrude products. ITE ΔP values (at 5° F.) below about 0.3 should be avoided as the product will be excessively fluid and will not have sufficient body so as to retain its extruded shape or have the ability to stand up in a cone or dish without sagging.

Suitable collapsible packages for the product of this invention could be in the shape of a toothpaste tube wherein the tube is rolled-up to force product out of an extrusion orifice. Alternative packaging could be a flexible pastry bag-type package which can also dispense product in a ribbon form.

The softness of the soft-frozen product has also been found to be a direct function of the formulations's equilibrium melting temperature ($T_m$). As will be recognized by those skilled in the art, $T_m$ is a temperature measurable by Differential Scanning Calorimetry (DSC). In the present instance, this measurement was made using a Dupont 990 Thermal Analyzer (available from E. I. Dupont de Nemours & Co., Inc., Wilmington, Del.). $T_m$ is measured as the temperature corresponding to the peak maximum of the melting endotherm for the first-order phase transition of ice to liquid water. The procedure used to measure $T_m$ is as follows. The sample (10 to 25 mg.), in the instrument, is quench-frozen with liquid Nitrogen to $-60°$ C., equilibrated at $-60°$ C. for 5 minutes, then warmed, at 5° C./min., from $-60°$ C. to $+40°$ C. Typical $T_m$'s are generally found in the range from $-10°$ C. to 0° C. for most ice cream-like products. For purposes of this invention, product $T_m$'s should be less than $-3°$ C., preferably less than $-4°$ C. In order to avoid excessive softness, $T_m$'s should be in excess of $-10°$ C., preferably above $-8°$ C.

STABILITY METHODOLOGY

It is well-known that extended freezer storage and temperature cycling of ice-cream/ice-milk products have an adverse effect on the texture of the products. Specifically, the ice crystal structure of the products undergoes changes as evidenced by the growth of ice crystals. The presence of large ice crystals will cause the product to be perceived organoleptically as having an icy texture. A two-week storage study test was employed as a predictive test for assessing the long-term storage stability of the products of this invention.

According to this test, plastic bowls (16 fl. oz. or 473 ml.) were filled with product exiting the ice cream freezer. The bowls are then covered and placed in a hardening room for at least 24 hours. Thereafter the bowls are stored in a freezer having only a single shelf for a period of two weeks. Over each 24-hour period the freezer temperature (normally at 0° F.) is cycled twice such that the core temperature of the product is raised to a temperature of 20° F. ($-6.7°$ C.).

The stability of the product is assessed by comparing product which has undergone the aforementioned, two-week, temperature cycling procedure against the same product which has been stored for two weeks at between $-15°$ to $-10°$ F. ($-26.1°$ to $-23.3°$ C.). Each sample is given an organoleptic texture rating by a panel consisting of at least three skilled tasters. The rating is on a scale of 0 to 10, with a rating of 0 indicating no perceived iciness (i.e. comparable to fresh high grade ice cream), a rating of 5 indicates a product having moderate sized ice crystals and borderline organoleptic acceptability, and a rating of 10 indicates the presence of large ice crystals and an unacceptable product.

PROCESSING

The products of this invention can be prepared using conventional ice cream technology. A suitable method for preparing the product of this invention comprises adding milk and cream to a steam-jacketed vat which is then brought to 90° F. (32.2° C.). Thereafter, milk solids are dissolved in the heated fluid and then the remaining ingredients are added. Preferably the emulsifiers and stabilizers are dry mixed with a small portion of a sugar component prior to being added to the vat. The mix is then pasteurized by holding at a temperature of 160° F. (71.1° C.) for thirty minutes.

The mix is then passed through a homogenizer of the typical dairy type. Although homogenization may be accomplished in one stage, it is carried out in two stages for best results. Typically, the pressure during the first stage is maintained at about 2,000 psi and the pressure during the second stage is maintained at about 500 psi. The mix is then aged at a temperature of about 40° F. (4.4° C.) for from 4 to 24 hours and then passed through an ice cream freezer where air or an inert gas is incorporated into the product which is cooled and extruded at sub-freezing temperatures of about 20° F. ($-6.7°$ C.) and thereafter stored in a hardening room at about $-15°$ F. ($-26.1°$ C.) or below.

The product can be whipped to any desirable overrun but usually will be within the range of 100–200%, preferably about 110–150%. Although greater than 200% overrun can be used such products have been found to be very slow-melting and lacking in coldness perception, probably due to the large amount of air which acts to insulate the product. High overrun products may also necessitate extra stabilization. Overruns below 100% are also possible if a more dense product is desired. It should also be noted with respect to overrun that, if the product is to be dispensed from an extruder-type package, an amount of overrun will be lost during the extrusion operation.

PRODUCT FORMULATION

The soft frozen dessert products of this invention are made with well-known food ingredients which provide the fat, protein, water and flavor constituents common in frozen desserts. The amount and exact character of each ingredient will depend upon such factors as the character of the other ingredients and the desired nature of the end product. The ingredients are now further described as to their functionality, type and levels.

The fat constituent aids in providing a creamy taste and the eating characteristics associated with ice cream-like desserts. It also contributes to the smoothness, the body and melting resistance of the frozen dessert. The amount of fat in the product is generally in the range of 3% to 15% by weight of the product. The exact amount of fat is not critical, although the amounts of other ingredients generally are to be adjusted as the amount of fat is changed. Dairy cream and milk are the preferred fat sources; however, other edible fats and oils will be suitable, provided they have unobjectionable taste. Different fats can be used alone or in combination with one another, including the combination of vegetable fats with milk fat. Vegetable oils and fats which may be used include cottonseed oil, soybean oil, corn oil, sunflower oil, palm oil, palm kernel oil, peanut oil, rice oil, safflower oil and coconut oil; and they may be partially or substantially hydrogenated.

A specific function of protein in the new dessert product concerns the attainment of overrun. A formulation with insufficient protein does not whip well and hence is considered deficient in holding the desired overrun. An excessive protein constituent, in contrast, results in a mixture that is unduly thick and does not process well with conventional equipment. The preferred source of the protein constituent of the new dessert product is milk solids not fat (MSNF). Milk solids not fat as used in the preferred compositions of this invention aid in providing the desirable properties of whipping ability, smoothness, body, mouthfeel, melt resistance, lowering of freezing point, and some sweetness. The MSNF can be derived from cream, milk (including condensed milk, skim milk, and condensed skim milk), and non-fat dry milk, or solely from non-fat dry milk solids. Buttermilk can also be used for a portion of the MSNF. Other protein sources with which the invention can be practiced, generally as substitution for a portion of the MSNF, include milk derived solids such as sweet dairy whey, neutralized acid whey, modified whey, whey protein concentrate, casein, modified casein, sodium caseinate, and calcium caseinate; and further include soy flour, modified soy flour, soy protein concentrate, soy isolate, egg protein (yolk and/or white), peanut flour, and peanut protein concentrate. The protein constituent generally accounts for 2% to 10% by weight of the new dessert.

Water is present in the new dessert product as a dispersion medium for the other ingredients of the emulsified product. The portion of water in the product which remains unfrozen provides fluidity for the product. The portion of water which does freeze forms ice crystals that give the product rigidity as well as the refreshing taste perception characteristic of a frozen dessert. An excessive water level is understood to affect adversely the rheological properties of the product. An insufficient water level also affects adversely the desired rheological and organoleptic properties. The water content of the formulations of this invention generally constitutes from 45% to 63% by weight of the product, including the water present in other ingredients, e.g. milk and cream.

The carbohydrate constituent of the new soft frozen dessert is a combination of saccharides that provides simultaneous control of freezing point depression, sweetness, body and texture, and storage stability. The combination of saccharides which the invention provides depresses the product freezing point for the desired extrudability and softness. Too much saccharide or an unsuitable saccharide combination can cause the product to be too soft, too sweet, or to be highly susceptible to ice crystal growth. An insufficient saccharide level can allow an excessive proportion of water to freeze, with the result that the product does not extrude satisfactorily at the relatively low temperature of interest. As previously noted the total carbohydrate level (from all sources) present in the products of this invention is from 24% to 34%. The preferred distribution of saccharides within the carbohydrate constituent will be further discussed below.

A stabilizer constituent may also contribute to the attainment of the desired performance features of the new in-home dessert. Stabilizers may be used to improve the ability of the product to withstand commercial shelf life and substantial heat shock without undue deterioration, such as a loss of overrun. The stabilizer may include vegetable or synthetic gums and typically includes a combination of gums. Carrageenans, guar gum, locust bean gum, alginates, xanthan gum and the like, gelatin, cellulose gums (e.g. methylcellulose) and micro-crystalline cellulose would be suitable for use in this invention. The amount of these stabilizers can vary widely, but generally will be from 0 to 2%, typically from 0.1 to 0.6%.

An emulsifier constituent is desirable for the practice of this invention and would be necessary when vegetable fats are included in the product formulation. A wide variety of emulsifiers may be employed, typically in amounts of from 0.2 to 1.0%. A suitable emulsifier system for use in this invention is a combination of mono- and diglycerides and polysorbate 80.

The flavoring constituent of the new soft serve dessert is selected from known flavoring ingredients according to the desired taste, taking into account the other ingredients. This constituent includes, by way of illustration, vanilla, vanilla extract, cocoa, fruits, nuts, and the like as well as other flavorings, both natural and artificial. Note, however, that the ingredient ranges specified herein, unless stated otherwise, are for an unflavored product. Those skilled in the art will comprehend the adjustments appropriate for the particular flavoring used.

According to this invention the sweetness of the product can be adjusted to meet any desired level by the use of known food ingredients. The products can be formulated to be free of either intensive sweeteners, such as saccharin or aspartame, or sweetness depressants such as quinine, theobromine, caffeine or naringen; however, the use of such additives to adjust sweetness levels to particular tastes is within the scope of this invention. The specific operative examples set forth in this disclosure represent products that achieve conventional levels of sweetness without the utilization of these additives.

SACCHARIDE DISTRIBUTION

A series of formulations were prepared, wherein the saccharide distribution was varied while the level of other ingredients was kept constant. Specifically these formulas contained a fixed fat level of 11%, a fixed water level of 54.5%, a constant emulsifier system of mono- and diglycerides and polysorbate 80 at a level of 0.43%, a constant stabilizer system consisting of sodium alginate at 0.05% and kappa carrageenan at 0.02%. These formulas were evaluated for extrudability at 5° F., $T_m$ and iciness after two weeks of temperature cycling, in accordance with the methodologies noted previously. Ratio 1 refers to the ratio of higher saccharides (3 or more saccharide units) to mono and disaccharides and Ratio 2 refers to the ratio of disaccharides to monosaccharides. The results are set forth in Tables 1 and 2 which also include formulas representing Example 1 of U.S. Pat. No. 4,219,581 to Dea and the Example of U.S. Pat. No. 4,244,977 to Kahn et al. All of the samples evaluated in the series retained an iciness rating of zero after two weeks of storage in a freezer maintained between −25° to −20° F. Runs 1 to 15 demonstrated the effects of varying saccharide distribution within an otherwise constant formulation on the softness and storage stability of the product.

Table 3 identifies additional formulations which were found to possess exceptionally good combinations of softness and storage stability, as noted by the results set forth in Table 4. Table 5 identifies formulations outside of Area B of FIG. 1 which were found to possess a storage stability which was considered unacceptable for a commercial product. The iciness ratings set forth in Tables 4 and 6 reflect two weeks of storage of the product in a freezer having a constant low temperature which varied only between −15° to −10° F., identified as controlled storage, and two weeks of storage according to the aforementioned stability methodology wherein the product is cycled between 0° F. and 20° F., identified as cycled storage.

TABLE 2

| Run # | Ratio 1 | Ratio 2 | Extrusion Pressure (psi) | Tm (°C.) | Iciness Rating | Within Area A | Within Area B |
|---|---|---|---|---|---|---|---|
| 1 | 0.54 | 8.7 | 1.70 | −3.0 | 3.5 | yes | no |
| 2 | 0.54 | 9.5 | 2.18 | −2.5 | 4.0 | yes | no |
| 3 | 0.54 | 10.1 | 1.44 | −3.5 | 3.5 | yes | no |
| 4 | 0.54 | 2.2 | 1.55 | −4.0 | 5.0 | yes | yes |
| 5 | 0.54 | 0.62 | 1.36 | −5.0 | 4.0 | yes | yes |
| 6 | 0.54 | 0.62 | 0.76 | −5.0 | 3.0 | yes | yes |
| 7 | 0.54 | 1.2 | 1.63 | −4.5 | 3.5 | yes | yes |
| 8 | 0.36 | 1.9 | 1.51 | −4.5 | 4.5 | yes | yes |
| 9 | 0.21 | 8.8 | 1.16 | −4.0 | 3.0 | yes | yes |
| 10 | 0.21 | 8.8 | 1.24 | −4.0 | 4.0 | yes | yes |
| 11 | 0.21 | 2.3 | 1.31 | −4.0 | 5.0 | yes | no |
| 12 | 0.21 | 2.3 | 1.33 | −3.5 | 5.0 | yes | no |
| 13 | 0.21 | 0.75 | 0.91 | −4.5 | 4.0 | no | no |
| 14 | 0.21 | 0.75 | 1.03 | −4.5 | 5.0 | no | no |
| 15 | 0.21 | 0.75 | 0.83 | −4.0 | 4.5 | no | no |
| 16 | 0.23 | 1.9 | 1.57 | −3.0 | N/A | yes | no |
| Dea | 0.07 | 51.72 | 0.82 | −3.0 | 8.0 | no | no |
| Kahn et al | 0 | 0.31 | 0.94 | −5.5 | 7.0 | no | no |

TABLE 3

| Run # | Fat | Water | Sucrose | Fructose | Dextrose | Higher Saccharides | Lactose | Maltose | Saccharides | Protein |
|---|---|---|---|---|---|---|---|---|---|---|
| 17 | 11 | 55.30 | 6.9 | 2.90 | 5.27 | 7.49 | 5.5 | 2.74 | 30.80 | 5.5 |
| 18 | 11 | 53.20 | 3.5 | 1.47 | 3.17 | 8.32 | 5.5 | 7.44 | 29.40 | 5.5 |
| 19 | 11 | 52.70 | 6.9 | 2.90 | 5.41 | 7.43 | 5.5 | 1.56 | 29.70 | 5.5 |
| 20 | 11 | 55.40 | 5.2 | 2.18 | 4.44 | 7.61 | 5.5 | 2.89 | 27.82 | 5.5 |
| 21 | 11 | 55.40 | 5.2 | 2.18 | 4.95 | 7.66 | 5.5 | 2.80 | 28.29 | 5.5 |
| 22 | 11 | 54.90 | 2.7 | 2.18 | 9.09 | 6.16 | 5.5 | 2.80 | 28.53 | 5.5 |
| 23 | 5.0 | 59.38 | 5.2 | 2.18 | 4.44 | 7.60 | 6.5 | 2.78 | 28.71 | 6.5 |
| 24 | 5.3 | 60.46 | 5.2 | 2.18 | 4.01 | 5.93 | 6.5 | 2.42 | 26.24 | 6.5 |

TABLE 4

| Run # | Ratio 1 | Ratio 2 | Extrusion Pressure (psi) | Tm (°C.) | Iciness Rating (Controlled Storage) | Iciness Rating (Cycled Storage) |
|---|---|---|---|---|---|---|
| 17 | 0.32 | 1.8 | 1.8 | −4.0 | — | — |
| 18 | 0.39 | 3.5 | 0.88 | −4.0 | 1.0 | 3.5 |
| 19 | 0.33 | 1.7 | 1.53 | −4.5 | 0 | 3.0 |
| 20 | 0.38 | 2.0 | 0.94 | −5.0 | 0 | 3.0 |
| 21 | 0.37 | 1.9 | 1.18 | −4.0 | 0 | 2.0 |
| 22 | 0.28 | 0.95 | 1.07 | −5.5 | 0 | 4.0 |
| 23 | 0.36 | 2.19 | 0.73 | −4.0 | 0 | 3.0 |
| 24 | 0.29 | 2.28 | 0.90 | −3.5 | — | — |

TABLE 1

| Run # | Sucrose | Fructose | Dextrose | Higher Saccharides | Lactose | Maltose | Total Saccharides | Protein |
|---|---|---|---|---|---|---|---|---|
| 1 | 9.52 | 0 | 1.9 | 10.0 | 5.5 | 1.58 | 28.5 | 5.5 |
| 2 | 5.11 | 0 | 1.76 | 10.0 | 5.5 | 6.13 | 28.5 | 5.5 |
| 3 | 2.16 | 0 | 1.67 | 10.0 | 5.5 | 9.17 | 28.5 | 5.5 |
| 4 | 1.11 | 4.0 | 1.76 | 10.0 | 5.5 | 6.13 | 28.5 | 5.5 |
| 5 | 0 | 9.52 | 1.90 | 10.0 | 5.5 | 1.58 | 28.5 | 5.5 |
| 6 | 0 | 0 | 11.42 | 10.0 | 5.5 | 1.58 | 28.5 | 5.5 |
| 7 | 3.0 | 4.21 | 4.21 | 10.0 | 5.5 | 1.58 | 28.5 | 5.5 |
| 8 | 7.0 | 3.66 | 3.66 | 7.5 | 5.5 | 1.18 | 28.5 | 5.5 |
| 9 | 11.0 | 0 | 2.4 | 5.0 | 5.5 | 4.60 | 28.5 | 5.5 |
| 10 | 14.81 | 0 | 2.4 | 5.0 | 5.5 | 0.79 | 28.5 | 5.5 |
| 11 | 10.0 | 6.26 | 0.95 | 5.0 | 5.5 | 0.79 | 28.5 | 5.5 |
| 12 | 10.0 | 0 | 7.21 | 5.0 | 5.5 | 0.79 | 28.5 | 5.5 |
| 13 | 1.92 | 0 | 13.4 | 5.0 | 5.5 | 2.68 | 28.5 | 5.5 |
| 14 | 1.92 | 12.51 | 0.89 | 5.0 | 5.5 | 2.68 | 28.5 | 5.5 |
| 15 | 1.92 | 6.70 | 6.7 | 5.0 | 5.5 | 2.68 | 28.5 | 5.5 |
| 16 | 4.89 | 3.66 | 3.66 | 5.0 | 8.0 | 0.79 | 26.0 | 8.0 |
| Dea | 14.12 | 0 | 0.39 | 1.52 | 5.71 | 0.34 | 22.1 | 4.6 |
| Kahn et al. | 0.70 | 19.35 | 2.15 | 0 | 5.90 | 0 | 28.1 | 5.9 |

TABLE 5

| Run # | Fat | Water | Sucrose | Fructose | Dextrose | Higher Saccharides | Lactose | Maltose | Total Saccharides | Protein |
|---|---|---|---|---|---|---|---|---|---|---|
| 25 | 11.0 | 53.06 | 1.7 | 1.51 | 15.41 | 0.38 | 7.8 | 0.04 | 26.84 | 5.5 |
| 26 | 11.0 | 53.20 | 1.7 | 1.51 | 15.51 | 0.76 | 7.8 | 0.12 | 27.40 | 5.5 |
| 27 | 5.0 | 56.46 | 1.7 | 1.51 | 18.69 | 1.46 | 5.5 | 0.28 | 29.14 | 5.5 |
| 28 | 11.0 | 53.00 | 1.7 | 1.51 | 15.37 | 0.22 | 7.8 | 0 | 26.60 | 5.5 |

TABLE 6

| Run # | Ratio 1 | Ratio 2 | Extrusion Pressure (psi) | Tm (°C.) | Iciness Rating (Controlled Storage) | Iciness Rating (Cycled Storage) |
|---|---|---|---|---|---|---|
| 25 | 0.01 | 0.56 | 0.91 | −5.5 | 1.0 | 9.5 |
| 26 | 0.03 | 0.57 | 0.85 | −5.0 | 0.5 | 9.0 |
| 27 | 0.05 | 0.37 | 0.58 | −4.5 | 3.0 | 9.5 |
| 28 | 0.01 | 0.56 | 0.53 | −5.0 | 1.0 | 9.5 |

A statistical analysis of the formulations and properties of the products identified in Tables 1 through 6, as well as numerous other formulation on which softness and/or storage stability data have been obtained, has led to the identification of a defined region of Ratio 1 and Ratio 2 values. This region includes products which function well as soft ice cream desserts in that they are extrudable from a collapsible package upon removal from a home freezer and have a high level of storage stability such that the product may be kept in a no-frost home freezer for several weeks, without the development of undesirable iciness.

FIG. 1 is a graph of Ratio 1 versus Ratio 2 for a range of frozen dessert products. The area within the dashed lines on the graph, designated as "Area A", defines a region which represents highly functional soft, ice cream-type dessert products as described above. This region satisfies a relationship such that the sum of Ratio 2 and 28 times Ratio 1 has a numerical value of from 7 to 28. This relationship may be expressed in equation form as follows:

$$7 \leq (28 \times \text{Ratio 1}) + \text{Ratio 2} \leq 28.$$

The area within the solid lines on the graph, designated as "Area B", defines a region which represents the more preferred products of this invention. Product formulations within "Area B" satisfy the following equation:

$$24 \leq (80 \times \text{Ratio 1}) + (3 \times \text{Ratio 2}) \leq 64.$$

According to highly preferred embodiments of this invention, Ratio 1 has a value of from 0.25 to 0.45, preferably from 0.27 to 0.40, and Ratio 2 has a value of from 0.90 to 9.0, preferably 1.7 to 6.0.

Specific embodiments of the soft-frozen, storage-stable dessert products of this invention are given in the following Examples.

EXAMPLE 1

An ice milk-type frozen confection, corresponding to Run 23 in Table 3, and having an overrun of approximately 130%, was prepared in accordance with the processing described above. The product formula was as follows:

| Ingredient | % (Weight) |
|---|---|
| Whole Milk (3.3% fat) | 56.01 |
| Heavy cream (38.5% fat) | 8.12 |
| Corn Syrup Solids (36 D.E.) | 10.34 |
| DMSNF | 7.85 |
| High Fructose Corn Syrup (71% solids) (42% fructose) | 7.25 |
| Sucrose | 5.15 |
| Corn Syrup (81% solids) (50 D.E.) | 4.24 |
| Vanilla Extract | 0.32 |
| Emulsifier (mono- and diglycerides - 80% and polysorbate 80 - 20%) | 0.29 |
| Emulsifier (mono- and diglycerides) | 0.14 |
| Vanillin Flavor | 0.16 |
| Stabilizer (sodium alginate - 50%/ Carbohydrate carrier - 50%) | 0.10 |
| Kappa Carrageenan | 0.02 |

EXAMPLE 2

An ice cream-type frozen confection, corresponding to Run 22 in Table 3, and having an overrun of approximately 200% was prepared as in Example 1. The product formula was as follows:

| Ingredient | % (weight) |
|---|---|
| Whole Milk | 40.27 |
| Heavy Cream | 24.98 |
| Corn Syrup Solids (36 D.E.) | 7.85 |
| High Fructose Corn Syrup (71% solids) | 7.25 |
| DMSNF | 6.25 |
| Corn Syrup (18% solid) | 4.24 |
| Sucrose | 2.66 |
| Dextrose | 5.47 |
| Vanilla Extract | 0.32 |
| Emulsifier (same as Example 1) | 0.29 |
| Vanillin Flavor | 0.16 |
| Emulsifier (same as Example 1) | 0.14 |
| Stabilizer (same as Example 1) | 0.10 |
| Kappa Carrageenan | 0.02 |

Having thus described the invention what is claimed is:

1. A frozen, aerated dessert product which is extrudable by hand from a collapsible package at temperatures between 0° F. and 10° F., said product having an equilibrium melting temperature ($T_m$) between $-3°$ C. and $-10°$ C. and said product having a water content of from 45% to 63% by weight, a fat content of from 3% to 15% by weight, a protein content of from 2% to 10% by weight and a total carbohydrate level of from 24% to 34%, said carbohydrate level including amounts of monosaccharides, disaccharide and higher saccharides such that the ratio of higher saccharides to mono- and disaccharides (Ratio 1) and the ratio of disaccharides to monosaccharides (Ratio 2) satisfy the relationship of $7 \leq (28 \times \text{Ratio } 1) + \text{Ratio } 2 \leq 28$.

2. The product of claim 1 wherein Ratio 1 and Ratio 2 satisfy the relationship $24 \leq (80 \times \text{Ratio } 1) + (3 \times \text{Ratio } 2) \leq 64$.

3. The product of claim 2 wherein Ratio 1 is from 0.25 to 0.45.

4. The product of claim 2 wherein Ratio 2 is from 0.90 to 9.0.

5. The product of claim 1 wherein the overrun is from 110% to 150%.

6. The product of claim 1 wherein the fat content is between 3.5% and 7%.

7. The product of claim 1 wherein the formulation is essentially free of polyols and sugar alcohols.

* * * * *

UNITED STATES PATENT OFFICE
CERTIFICATE OF CORRECTION

Patent No. 4,374,154  Dated February 15, 1983

Inventor(s) Cole et al.

It is certified that error appears in the above-identified patent and that said Letters Patent are hereby corrected as shown below:

Claim 1 line 5 after "-10°C." insert --said product being essentially free of polyols and sugar alcohols,--

Delete claim 7.

On the cover sheet after "Abstract", "7 Claims" should read -- 6 Claims --.

Signed and Sealed this

Twenty-sixth Day of April 1983

[SEAL]

Attest:

Attesting Officer

GERALD J. MOSSINGHOFF
Commissioner of Patents and Trademarks